Sept. 18, 1934.  J. R. GLAU  1,974,358
FISHING HOOK
Filed April 13, 1933
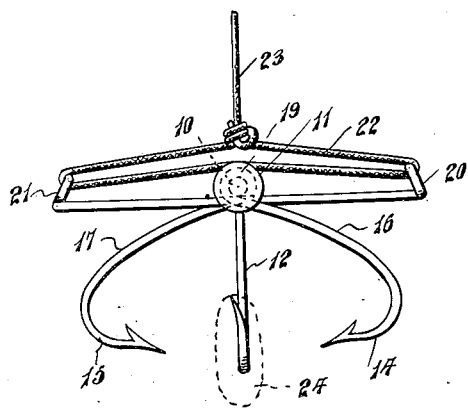
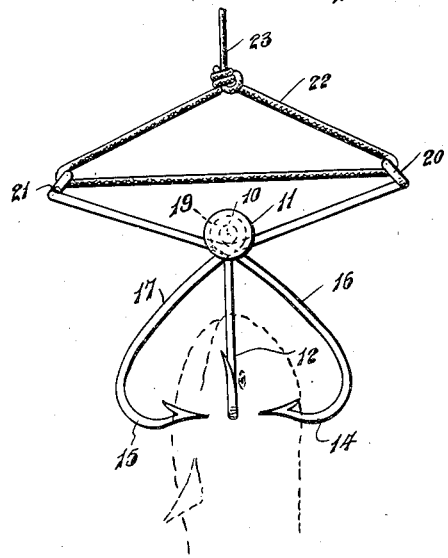
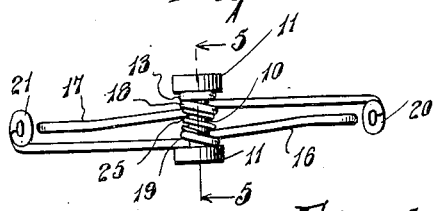
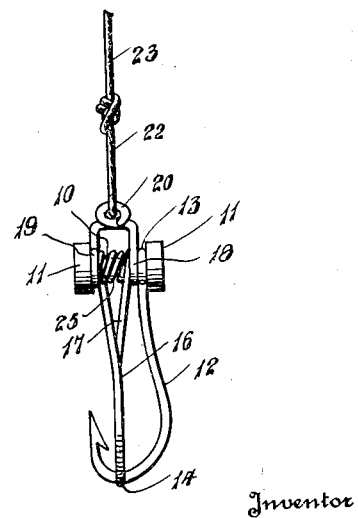
Inventor
J. R. Glau.

Patented Sept. 18, 1934

1,974,358

UNITED STATES PATENT OFFICE 1,974,358

FISHING HOOK

Julius R. Glau, San Antonio, Tex.

Application April 13, 1933, Serial No. 666,023

4 Claims. (Cl. 43—89)

The invention relates to fishing hooks and has for its object the provision of a fishing hook comprising a hook for holding the bait or lure, and a pair of impaling hooks pivotally mounted relatively to the lure hook to engage the head of the fish to prevent loss of the victim in landing it, said impaling hooks being pivotally mounted on a common pivot and having an expansible coil spring laterally engaging the pivot of the hooks to frictionally hold the hooks in adjusted positions and permitting easy movement of the hooks by pulling on the fishing line after the fish strikes.

The invention will be described in detail hereinafter and will be found illustrated in the accompanying drawing, in which Figure 1 is a view in elevation of the improved hook showing the tackle in set position, Figure 2 is a similar view showing the tackle in position to engage the head of the fish after a strike, Figure 3 is a top plan view of the hook with the fishing line removed, Figure 4 is a side view in elevation, and Figure 5 is a sectional view on a plane indicated by the line 5—5 of Figure 3.

Referring to the drawing, in which similar reference characters are used to designate corresponding parts in all of the views, the improved fishing hook is mounted on a pivot pin 10 having terminal heads 11. Suspended from said pivot pin 10 is a lure hook 12 by means of a loop 13. Pivotally mounted on said pivot pin 10 are impalement hooks 14 and 15 having their stems or shanks 16 and 17 respectively provided with loops 18 and 19 intermediate of the hooks 14 and 15 and the opposite ends of the stems. The extremities of the stems 16 and 17 are provided with eyelets or loops 20 and 21, respectively, each of said eyelets being offset from their respective stems in the direction of the other hooks so that the eyelets are substantially alined and are adapted to receive a loop 22 on the end of the fishing line 23, said loop being threaded through the eyelets as shown in Figures 1, 2, and 4.

Obviously it is essential that the hooks 14 and 15 be spaced from the lure hook 12 before the fish strikes at the bait 24 thereon, and to insure holding the hooks in the open adjusted position an expansible coil spring 25 is mounted on the pivot pin 10 and terminally engages the loops 18 and 19 on the impalement hooks 14 and 15, to hold said loops in frictional engagement with the loop 13 of the lure hook 12 and the head 11 at the opposite end of the pivot pin 10, respectively, said spring, however, not preventing pivotal movement of said hooks into impaling positions with the head of the fish, as shown in Figure 2 after the fish strikes the bait and causes a pull on the fishing line 23.

What is claimed is:—

1. In a fish hook, a pair of hooks pivoted on a common pivot, and a spring member mounted on said pivot and terminally abutting the pivoted portions of the hooks to frictionally hold them in adjusted positions.

2. In a fish hook, a pivot pin having a head on each terminal, a pair of hooks pivotally engaging said pin, and a coil spring mounted on the pin intermediate of the hooks, spacing them, and the spring terminally abutting the hooks and tensioned to frictionally hold them in adjusted positions.

3. In a fish hook, a pivot pin having a head on each terminal, a pair of hooks, the shanks of said hooks being provided with loops intermediate of their ends to receive the pivot pin, loops on the extremities of the shanks remote from the hook bills to receive a loop on the end of a fishing line, and a coil spring mounted on said pivot pin and terminally abutting the first mentioned loops, said spring holding said loops in frictional engagement with the heads on the pivot to hold the hooks in adjusted positions.

4. In a fish hook, a pivot pin having a head on each terminal, a hook suspended from said pin and adapted to hold a lure, other hooks having loops intermediate of their bills and the opposite ends of the shanks, said loops pivotally receiving the pivot pin, the ends of the shanks of said other hooks remote from the bills having loops to receive a loop on a fishing line, and a coil spring mounted on said pivot pin and terminally engaging the first mentioned loops, said spring holding said loops in frictional engagement with the heads on the pivot to hold the engaged hooks in adjusted positions.

JULIUS R. GLAU.